UNITED STATES PATENT OFFICE.

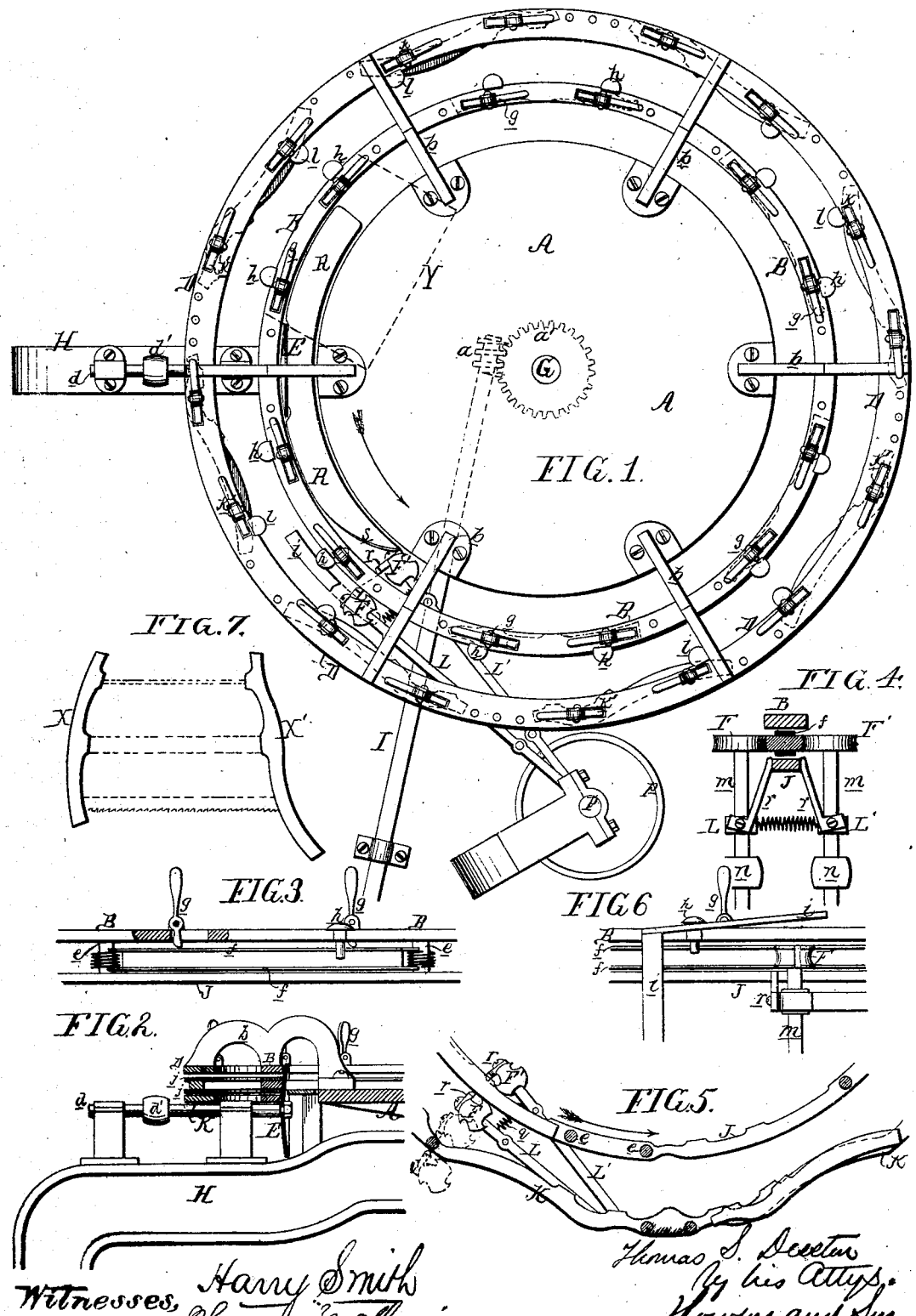

THOMAS S. DISSTON, OF PHILADELPHIA, PENNSYLVANIA.

IMPROVEMENT IN MACHINES FOR MAKING BUCK-SAW FRAMES.

Specification forming part of Letters Patent No. 147,110, dated February 3, 1874; application filed October 1, 1873.

*To all whom it may concern:*

Be it known that I, THOMAS S. DISSTON, of the city and county of Philadelphia, State of Pennsylvania, have invented a Machine for Making Buck-Saw Frames, &c., of which the following is a specification:

The object of my invention is to facilitate the cutting out and finishing of buck-saw frames and other curved objects, such as wheel-fellies, &c., by a machine consisting, principally, of a rotating circular table, A, concentric rings B and D, secured thereto, a circular saw, E, and rotary cutter F F', the work being clamped to the rings, and carried by the same to the circular saw, which rough-cuts the work, a further movement of the rings in the same direction carrying the work between the cutters F F', which are connected by springs, and moved from and toward each other by pattern-bars secured to the rings, and which serve to finish the edges of the said work at the required points, all as best observed in the plan view, Figure 1, of the accompanying drawing.

The table A is secured to the upper end of a vertical shaft, G, fitted to suitable bearings in a frame, H, and arranged to be slowly rotated by a worm, a, on a driving-shaft, I, which gears into a worm-wheel, a', on the said vertical shaft. The rings B and D rotate with the table A, to which they are permanently secured by radial arms b, an annular space intervening between the table and ring B, and a similar space between the latter and the outer ring D. (See Fig. 1, and sectional elevation, Fig. 2.) The circular saw E, which is concavo-convex in order to facilitate the cutting of curved objects, extends into the space between the table and ring B, and is secured to a spindle, d, turning in suitable bearings on the frame H, and provided with a driving-pulley, d'. (See Figs. 1 and 2.) Immediately beneath the ring B, and secured to the same at intervals by rods e, is an annular pattern-bar, J, more particularly referred to hereafter, and shown in the elevation, Fig. 3, transverse section, Fig. 4, and sectional plan, Fig. 5. Between the said pattern-bar and ring are clamping-plates f f, arranged in pairs, and guided, at their opposite ends, by the rod e, on which are spiral springs, tending to separate the said plates, the latter being forced together by cam-levers g, hung to the ring B, and projecting through slots in the same, so as to bear on the uppermost plate, as best observed in Fig. 3. Directly opposite each pair of clamping-plates f, and suspended from the outer circumference of the ring B, are two stop-pins, h h, arranged to have a vertical sliding movement in the said ring, so that when carried toward the rotary cutters F F' they may be lifted above the same by a fixed cam-plate, i, which is overhung by the heads of the said pins, as shown in Fig. 1, and in the elevation, Fig. 6. The outer ring D is also provided with an annular pattern-bar, K, and with spring clamping-plates j j, cam-levers K', and stop-pins l, corresponding with those of the ring B, the main points of difference being the shape of the pattern-bar and the position of the stop-pins, which are on the inner instead of the outer circumference of the ring. The rotary cutters F F' are grooved in the manner best observed in Fig. 4, so as to round the opposite edges of an object passed between them, and they are secured to the upper ends of vertical spindles m, which have their bearings in frames L and L', hung to the vertical driving-shaft P, from which the cutter-spindles derive their movement, through the medium of belts adapted to the pulleys n and p. The frames L and L' can be turned freely and independently of each other in a horizontal plane upon the shaft P, which permits the cutters to be adjusted from and toward each other, or moved in the arc of a circle, of which the shaft P is the center. In the drawing, the cutters are represented as situated directly beneath and on opposite sides of the ring B, and the frames L and L' are connected together by a spiral spring, q, which draws the cutters toward each other to the extent permitted by adjustable arms r r, secured to the said frames, and bearing against the opposite edges of the pattern-bar J. (See Figs. 4 and 5.)

The pattern-bar J of the ring B is so shaped as to properly guide the cutters in finishing the handle X of a buck-saw frame, (illustrated in Fig. 7;) and the pattern-bar K of the outer ring is correspondingly shaped, for the guidance of the cutters in finishing the longer handle X' of the said frame.

The operation of the machine is as follows:

After starting the saw and cutters, a slow rotary movement in the direction of the arrow, Fig. 1, is imparted to the table A, and blocks of wood Y, of a proper thickness for the handles X of the saw-frame, are inserted between the clamping-plates $f$ of the ring B to the extent permitted by the stop-pins $h$, the outer edges of the said blocks having been previously sawed to a curve corresponding with that of the ring, which is the proper curve for the handle. The cam-levers $g$ are next turned in such a direction as to force the clamping-plates $f$ together and against the opposite sides of the block, after which the latter, by the rotation of the table, is carried past the saw E, the severed piece, which will be of exactly the proper width for a saw-handle, being carried on toward the rotary cutters F F', while the block is drawn in toward the center of the table and out of the way of the saw by the curved flange $s$ of a fixed plate, R, which occupies a portion of the space between the ring B and table. (See Fig. 1.) As the severed strip approaches the rotary cutters, the stop-pins $h$ are raised out of the way of the latter by passing over the fixed cam-plate $i$, as before described, and as illustrated in Fig. 6, the said pins dropping to their original positions after passing the said cam and cutters. In passing between the cutters, the opposite edges of the several strips are rounded or finished at the required points, as determined by the shape of the pattern-bar J, against the opposite edges of which the arms $r$ $r$ of the cutter-frames are caused to bear by the action of the spring $q$, as before described, and as represented in Figs. 4 and 5. After passing the cutters, the finished handle X is withdrawn from between the clamping-plates to make way for another piece to be severed from the same block Y, a succession of strips being thus sawed and finished from the several blocks. The longer handle X' of the saw-frame, being formed on a succession of curves, cannot be sawed on the machine, but is cut out by a gig-saw or otherwise, and is then clamped to the outer ring D, to be submitted to the action of the cutters, the latter being simply turned outward by an adjustment of their frames L and L' until they embrace the pattern-bar K of the outer ring, the operation of the several parts being then precisely the same as with the inner ring B and its appliances.

The machine, it will be evident, can be readily adapted to the sawing and finishing of wheel-fellies and other curved objects.

I claim as my invention—

1. A sawing and finishing machine in which are combined a rotating work-table, A, a concentric work-holding ring or rings secured to and moving with the said table, a circular saw, E, and rotary cutters F F', all substantially as and for the purpose specified.

2. The combination of the work-holding rings B and D with rotary cutters F and F', admitting of adjustment to a position opposite either of said rings in the arc of a circle described from the center of their driving-shaft, all substantially as specified.

3. The combination of the rotary cutters F F' with pattern-bars carried by the work-holding rings, and with which the said cutters are maintained in contact by springs, as set forth.

4. The cutter-frames L and L', hung to and rendered adjustable on the driving-shaft P, connected together by a spring, $q$, and provided with arms $r$, for bearing against the opposite edges of the pattern-bars, all substantially as specified.

5. The combination, with the work-holding rings, of spring clamping-plates, operated by cam-levers, as and for the purpose specified.

6. The combination, substantially as described, of the adjustable stop-pins $h$ with the fixed cam-plate $i$.

7. The fixed plate R, with its curved flange $s$, for the purpose specified.

In testimony whereof I have signed my name to this specification in the presence of two subscribing witnesses.

THOS. S. DISSTON.

Witnesses:
  WM. A. STEEL,
  HARRY SMITH.